(12) United States Patent
Nagaya (10) Patent No.: US 9,987,889 B2
(45) Date of Patent: Jun. 5, 2018

(54) FUNCTIONAL COMPONENT MOUNTING BASE AND TIRE

(71) Applicant: BRIDGESTONE CORPORATION, Tokyo (JP)

(72) Inventor: Go Nagaya, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days. days.

(21) Appl. No.: 15/119,918

(22) PCT Filed: Feb. 10, 2015

(86) PCT No.: PCT/JP2015/053662
§ 371 (c)(1),
(2) Date: Aug. 18, 2016

(87) PCT Pub. No.: WO2015/129453
PCT Pub. Date: Sep. 3, 2015

(65) Prior Publication Data
US 2017/0066294 A1    Mar. 9, 2017

(30) Foreign Application Priority Data

Feb. 27, 2014 (JP) ................................. 2014-036806

(51) Int. Cl.
*B60C 23/04* (2006.01)
*B29D 30/00* (2006.01)
*B60C 19/00* (2006.01)

(52) U.S. Cl.
CPC ...... *B60C 23/0493* (2013.01); *B29D 30/0061* (2013.01); *B29D 2030/0072* (2013.01); *B60C 2019/004* (2013.01)

(58) Field of Classification Search
CPC ................ B60C 23/04; B60C 23/0493; B60C 2019/004; B29D 30/0061; B29D 2030/0072
See application file for complete search history.

(56) References Cited

U.S. PATENT DOCUMENTS 6,030,478 A * 2/2000 Koch ..................... B60C 23/04
152/152.1
6,546,982 B1    4/2003 Brown et al.
(Continued)

FOREIGN PATENT DOCUMENTS

| CN | 1290216 A | 4/2001 |
| CN | 101460320 A | 6/2009 |

(Continued)

OTHER PUBLICATIONS

International Search Report for PCT/JP2015/053662 dated May 19, 2015 [PCT/ISA/210].

(Continued)

*Primary Examiner* — Anita M King
(74) *Attorney, Agent, or Firm* — Sughrue Mion, PLLC (57) ABSTRACT

In order to provide a functional component mounting base having high durability to an inertial force acting on a functional component when a tire engages with and disengages from the road surface and to an impact force acting on the functional component mounting base when the tire passes over bumps the functional component mounting base (1) is formed of a rubber material, is attached to an inner surface (70) of the tire to mount the functional component (29) on the inner surface (70) of the tire, and characterized by being provided with a fitting recess (2) into which a functional component-side attaching portion (30) provided on the functional component (29) is fitted. The fitting recess (2) is formed such that an opening diameter of an opening (3) to the fitting recess is smaller than a maximum diameter (Continued)

of the functional component-side attaching portion (30), an inner surface (inner peripheral surface (9)) of the fitting recess (2) is formed as a fitting surface that fits with an outer surface (outer peripheral surface (31)) of the functional component-side attaching portion and a bottom of the fitting recess (2) is formed as raised and recessed portions (semicircular projections (5, 6) and a partition recess (8)) which fit with recessed and raised portions (semicircular recesses (34, 35) and a partition projection 33) formed on the functional component-side attaching portion (30).

4 Claims, 6 Drawing Sheets

(56) References Cited

U.S. PATENT DOCUMENTS

| | | | | |
|---|---|---|---|---|
| 7,908,918 | B2* | 3/2011 | Brusarosco | B60C 23/0493 73/146.5 |
| 8,022,817 | B2* | 9/2011 | Wilson | B60C 23/0433 340/426.33 |
| 8,984,936 | B2* | 3/2015 | Brusarosco | B60C 23/0493 73/146 |
| 9,694,632 | B2* | 7/2017 | Mancosu | B60C 23/0493 |
| 9,764,602 | B2* | 9/2017 | Paturle | G01M 17/025 |
| 2006/0158340 | A1* | 7/2006 | Wilson | B60C 23/0493 340/693.12 |
| 2006/0201241 | A1 | 9/2006 | Durif | |
| 2006/0220816 | A1 | 10/2006 | Scheungraber et al. | |
| 2007/0175554 | A1* | 8/2007 | Bertrand | B60C 23/0493 152/152.1 |
| 2009/0183562 | A1 | 7/2009 | Brusarosco et al. | |
| 2011/0025487 | A1* | 2/2011 | Laird | B60C 23/0493 340/447 |
| 2014/0033814 | A1 | 2/2014 | Wen et al. | |
| 2014/0124636 | A1 | 5/2014 | Nagaya | |
| 2015/0122006 | A1* | 5/2015 | Yamaguchi | B60C 23/0493 73/146.8 |
| 2017/0057304 | A1* | 3/2017 | So | B60C 23/0493 |
| 2017/0246923 | A1* | 8/2017 | Tanno | B60C 19/00 |

FOREIGN PATENT DOCUMENTS

| | | |
|---|---|---|
| CN | 103575453 A | 2/2014 |
| DE | 10-2007030231 A1 | 1/2009 |
| DE | 10-2008045016 A1 | 4/2010 |
| EP | 2 845 751 A1 | 3/2015 |
| JP | 2002-524326 A | 8/2002 |
| JP | 2013-014201 A | 1/2013 |
| JP | 2013-226853 A | 11/2013 |
| WO | 99/41093 A1 | 8/1999 |

OTHER PUBLICATIONS

Written Opinion for PCT/JP2015/053662 dated May 19, 2015 [PCT/ISA/237].

Communication dated Mar. 20, 2017, issued from the State Intellectual Property Office of People's Republic of China in counterpart Application No. 201580010768X.

Communication dated Jan. 20, 2017, from the European Patent Office in corresponding Application No. 15755262.1.

International Preliminary Report on Patentability issued from the International Bureau in counterpart application No. PCT/JP2015/053662, dated Sep. 9, 2016.

* cited by examiner

|  | HIGH-SPEED DURABILITY TEST | BUMP PASSING-OVER TEST |
|---|---|---|
| EMBODIMENT | NOT DAMAGED | NOT DAMAGED |
| COMPARATIVE EXAMPLE 1 | DAMAGED | NOT DAMAGED |
| COMPARATIVE EXAMPLE 2 | NOT DAMAGED | DAMAGED |

FUNCTIONAL COMPONENT MOUNTING BASE AND TIRE

CROSS REFERENCE TO RELATED APPLICATIONS

This application is a National Stage of International Application No. PCT/JP2015/053662 filed Feb. 10, 2015, claiming priority based on Japanese Patent Application No. 2014-036806 filed Feb. 27, 2014, the contents of all of which are incorporated herein by reference in their entirety.

TECHNICAL FIELD

The present invention relates to a functional component mounting base for mounting a functional component having a function of detecting tire conditions on the inner surface of a tire.

BACKGROUND ART

Known in the art is a functional component mounting base that mounts a functional component, such as a pressure sensor, a temperature sensor, a battery or a power generating element, a wireless device, or a sensor module combining them, on the inner surface of a tire.

A tire fitted on a vehicle rolls, when the vehicle travels, on the ground with the lowest part of the periphery thereof in contact with the ground. Thus the non-contacting part of the tire moves in rotational motion while the ground-contacting part thereof moves in linear motion. Accordingly, there occur states of imbalance in centripetal forces as the tire rotates at the leading end, a boundary at which a non-contacting periphery of the tire keeps changing into a ground-contacting periphery, and at the trailing end, another boundary at which a ground-contacting periphery of the tire keeps changing into a non-contacting periphery. And inertia forces act on the functional component mounted on the inner surface of the tire through the functional component mounting base. These inertia forces increase with the revolution speed of the tire and can sometimes reach several dozen kgf. As a result, the functional component mounting base with a functional component mounted thereon may suffer damage, and the functional component may fall off the base.

Also, the inner surface of the tire in the non-contacting part maintains a certain curvature, but is horizontal in the ground-contacting part. As the tire rolls, therefore, there occur repetitive distortions in the direction of tire rotation. Furthermore, when the tire passes over a large bump, the inner surface of the tire may undergo an inverse R deformation, thus causing a large distortion in the direction of tire rotation. Hence, the functional component mounting base may get damaged with the functional component falling off the base.

Known as a remedial measure is a functional component mounting base that has a structure featuring improved high-speed durability. This functional component mounting base has a rubber bottom plate which is equipped with a functional component securing mechanism consisting of a frame body and an insertion piece having a predetermined rigidity (see Patent Document 1, for instance).

RELATED ART DOCUMENT

Patent Document

Patent Document 1: Japanese Unexamined Patent Application Publication No. 2012-245889

SUMMARY OF THE INVENTION

Problem to be Solved by the Invention

The functional component mounting base as disclosed in Patent Document 1 is equipped with a functional component securing mechanism having a predetermined rigidity. It is therefore a functional component mounting base with a considerable high-speed durability capable of withstanding the above-mentioned inertia forces by the entirety of the base structure. However, the functional component securing mechanism is constructed of a material (e.g., a metal) whose rigidity is higher than that of the rubber bottom plate of the mounting base. Thus, when an impact force acts on the functional component mounting base with the tire passing over a bump, for instance, the deformation of the rubber bottom plate may be confined by the functional component securing mechanism, and distortion tends to be concentrated to the interface, which becomes a rigidity difference, between the frame body of the functional component securing mechanism and the rubber bottom plate. And eventually this may lead to a decline in durability of the functional component mounting base.

The present invention provides a functional component mounting base featuring high durability capable of withstanding inertia forces that act on the functional component when the rolling tire engages with and disengages from the road surface and impact forces that act on the functional component mounting base when the tire passes over bumps.

Means for Solving the Problem

The functional component mounting base according to the present invention is formed of a rubber material and attached to an inner surface of a tire to mount a functional component on the inner surface of the tire. The functional component mounting base has a fitting recess into which a functional component-side attaching portion provided on the functional component is fitted. The fitting recess is formed such that an opening diameter of an opening to the fitting recess is of a dimension smaller than a maximum diameter of the functional component-side attaching portion. And the inner surface of the fitting recess is formed as a fitting surface that fits with an outer surface of the functional component-side attaching portion. Further, a bottom of the fitting recess is formed with raised and recessed portions which fit with recessed and raised portions formed on the functional component-side attaching portion. Accordingly, the inertia forces that act on the functional component when the rolling tire engages with and disengages from the road surface can be supported in a dispersed manner by a plurality of fitting surfaces of the raised and recessed portions on the functional component mounting base fitted with the recessed and raised portions on the functional component-side attaching portion. At the same time, the distortions resulting from the impact forces that act on the functional component mounting base when the tire passes over bumps can be absorbed by the elastic deformation of the functional component mounting base and slides along the contact interface between the functional component-side attaching portion and the functional component mounting base. Thus, the invention can provide a functional component mounting base featuring high durability.

Hereinafter, the invention will be described based on embodiments which do not intend to limit the scope of the claims of the present invention but exemplify the invention. All of the features and the combinations thereof described in the embodiments are not necessarily essential to the means to solve problems propounded by this invention, and they also include constructions and arrangements to be employed selectively.

MODES FOR CARRYING OUT THE INVENTION

Figure 1:
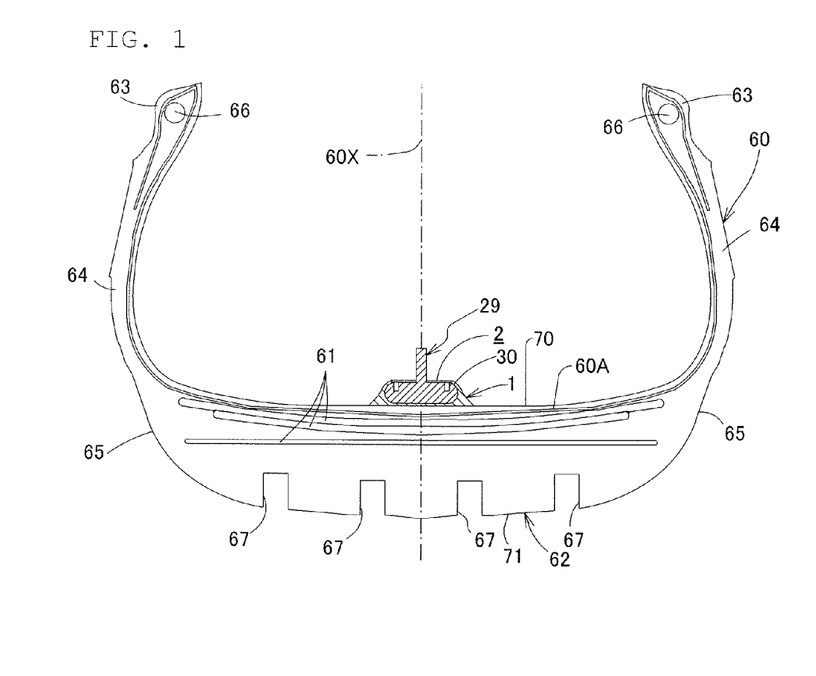
FIG. 1 is a cross sectional view of a tire in a state where a functional component is mounted on an inner surface of the tire via a functional component mounting base.

A functional component mounting base 1 according to an embodiment attached to an inner surface 70 of a tire 60 to mount a functional component 29 on the inner surface 70 of the tire 60, as shown in FIG. 1, is made of a rubber material.

The functional component mounting base 1 has a fitting recess 2 into which a functional component-side attaching portion 30 provided on the functional component 29 is fitted.

It is to be noted that the tire 60 is constructed of a carcass 60A, belts 61, tread region 62, bead regions 63, sidewall regions 64, and shoulder regions 65. The carcass 60A is a plurality of cord layers stacked from the inner surface 70 side to the outer surface 71 side of the tire 60 toroidally straddling a pair of bead regions 63, 63. For example, the carcass 60A has both ends of a plurality of layers on the inner side as turned-up plies which are folded back about the bead core 66 in the bead region 63 from radially inside to outside. And it has both ends of a plurality of layers on the outer side as turned-down plies which are folded back about the bead core 66 in the bead region 63 from radially outside to inside. The belts 61 are disposed between the carcass 60A and the tread region 62. The tread region 62 is disposed on the radially outer side of the carcass 60A and the belts 61. Formed in the surface of the tread region 62 are a plurality of main circumferential grooves 67 extending in the circumferential direction of the tire.

Figure 2:
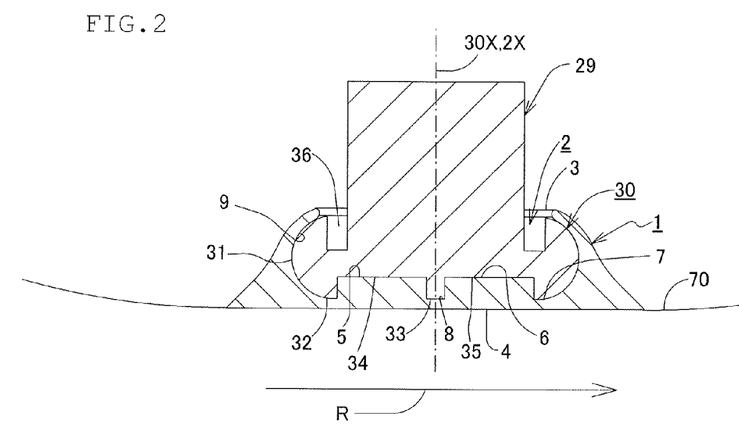
FIG. 2 is a cross sectional view showing the functional component mounting base attached to an inner surface of the tire and the functional component mounted on the functional component mounting base.
Figure 3:
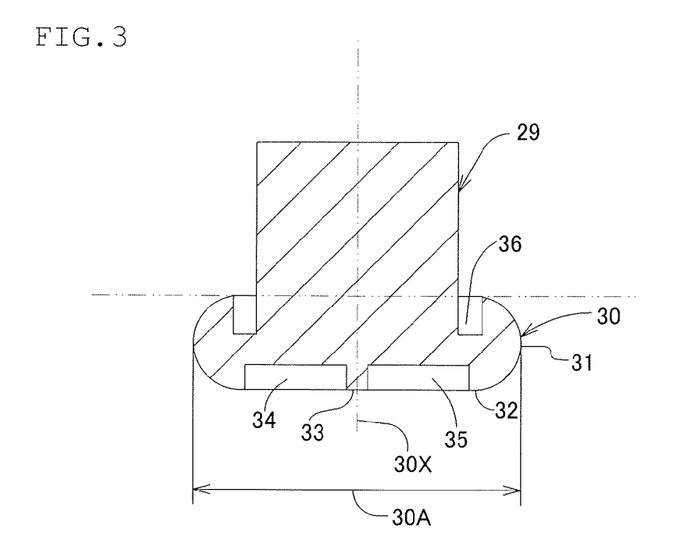
FIG. 3 is a cross sectional view showing the functional component and the functional component-side attaching portion.
Figure 5:
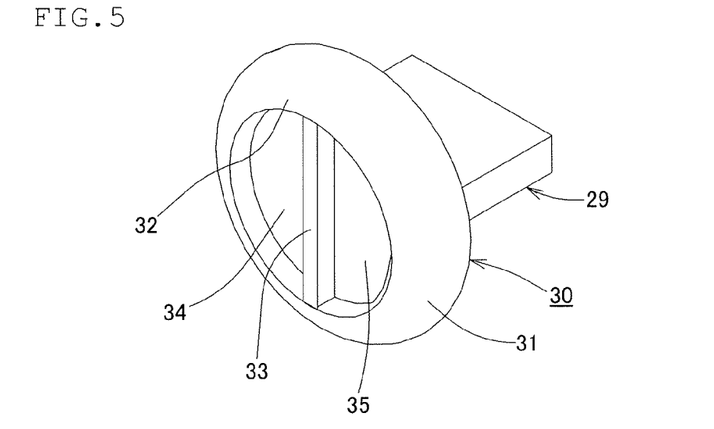
FIG. 5 is a perspective view of the functional component-side attaching portion seen from a bottom side.

A description is given of a functional component-side attaching portion 30 provided on the functional component 29 with reference to FIG. 2, FIG. 3, and FIG. 5.

The functional component-side attaching portion 30, which is made of a synthetic resin, for instance, is formed into a cylindrical body. The cylindrical body is formed such that the diameter of the middle part along the central axis 30X thereof (maximum diameter 30A of the functional component-side attaching portion 30) is larger than the diameter of the respective ends thereof along the central axis 30X. That is, the outer peripheral surface 31 of this cylindrical body is formed by the outer peripheral surface with a semicircular cross section of the annular body with a circular cross section around the central axis 30X of this cylindrical body.

The bottom of the cylindrical body is comprised of an annular surface 32 continuing from the outer peripheral surface 31 thereof around the central axis 30X, a partition projection 33 dividing a circular recess provided on the bottom thereof inside the annular surface 32 with the central axis 30X at the center into two parts, and two semicircular recesses 34 and 35, which are the two parts divided by the partition projection 33.

Also, formed along the boundary with the outer peripheral surface 31 of the cylindrical body at the top (one end) thereof is an annular recess 36 with the central axis 30X at the center. This annular recess 36 makes it easier for the top part of the cylindrical body to flex and improves the sliding along the contact interface between the outer peripheral surface 31 of the cylindrical body and the inner peripheral surface 9 of the fitting recess 2 to be discussed later.

Figure 4:
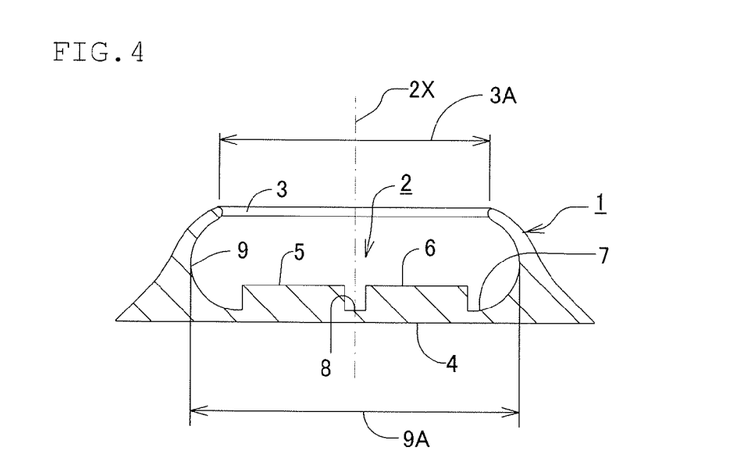
FIG. 4 is a cross sectional view showing the functional component mounting base.
Figure 6:
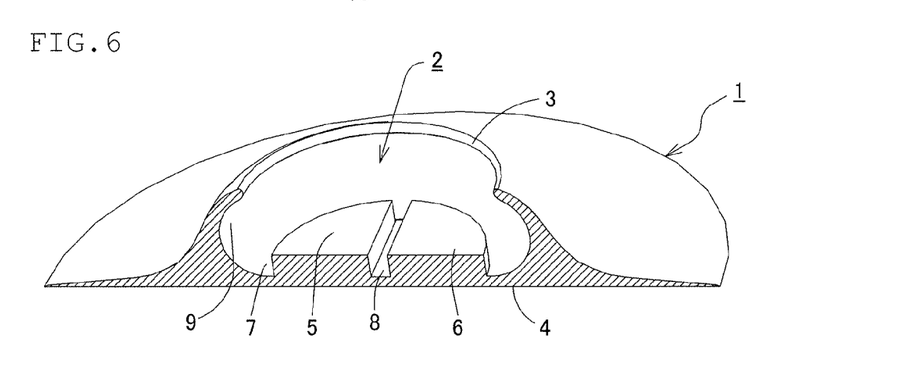
FIG. 6 is a perspective view (partially cross section) of the functional component mounting base.

A description is given of a functional component mounting base 1 with reference to FIG. 2, FIG. 4, and FIG. 6.

The functional component mounting base 1 has a fitting recess 2 formed inside a circular recess of a cylindrical shape with a one-end opening 3 into which the cylindrical body constituting the functional component-side attaching portion 30 is fitted.

The fitting recess 2 is formed such that the opening diameter 3A of the opening 3 to the fitting recess 2 for inserting the functional component-side attaching portion 30 is of a dimension smaller than the maximum diameter 30A of the cylindrical body of the functional component-side attaching portion 30. Also, the inner surface of the fitting recess 2 is formed as a fitting surface to fit with the outer surface of the functional component-side attaching portion 30.

That is, the bottom of the fitting recess 2 located opposite to the outer bottom surface 4 of the functional component mounting base 1 attached to the inner surface 70 of the tire 60 is formed with raised and recessed surfaces to fit with the recessed and raised portions (two semicircular recesses 34 and 35, annular surface (raised portion) 32, partition projection (raised portion) 33) formed on the bottom of the functional component-side attaching portion 30.

In other words, the bottom the fitting recess 2 is configured to have two semicircular raised portions 5 and 6 to fit with the two semicircular recesses 34 and 35 formed on the bottom of the functional component-side attaching portion 30, an annular recessed portion 7 into which the annular face 32 and the bottom of the outer peripheral surface 31 continuing to the annular face 32 are fitted, and a partition recessed portion 8 partitioning the semicircular raised portions 5 and 6.

Also, the inner peripheral surface 9 of the fitting recess 2 is formed as a surface (semicircular-sectioned outer peripheral surface constituting the outer periphery of an annular body having a circular cross section around the central axis 2X of the fitting recess 2) to fit with the outer peripheral surface 31 of the cylindrical body of the functional component-side attaching portion 30.

And the fitting recess 2 having a cylindrical shape is formed such that the diameter (maximum diameter 9A of the fitting recess 2) of the middle part along the central axis 2X thereof is greater than the opening diameter 3A of the opening 3 thereof and the diameter of the bottom thereof.

Also, the outer bottom surface 4 of the functional component mounting base 1 is formed into a circular surface with the central axis 2X of the fitting recess 2 at the center, for instance. And the diameter of the circular surface is of a dimension larger than the maximum diameter 9A of the fitting recess 2.

As shown in FIG. 1, the functional component mounting base 1 according to the embodiment of the invention is disposed on the inner surface 70 of the tire 60 in such a manner that the central axis 2X of the fitting recess 2 coincides with the equatorial plane 60X of the tire 60. At the same time, as shown in FIG. 2, the functional component mounting base 1 is attached to the inner surface 70 of the tire 60 with the outer bottom surface 4 thereof cure-bonded to the inner surface 70, for instance, such that the two semicircular projections 5 and 6 thereof are arranged side by side in the circumferential direction R of the tire 60.

Then, the functional component-side attaching portion 30 is inserted into the fitting recess 2 with the opening 3 of the functional component mounting base 1 attached to the inner surface 70 of the tire 60 spread wider, and the recessed and raised surfaces of the functional component-side attaching portion 30 are fitted with the raised and recessed surfaces in the fitting recess 2. Thus the functional component 29 is mounted on the functional component mounting base 1 with the result that the functional component 29 is mounted on the inner surface 70 of the tire 60 via the functional component mounting base 1.

Figure 8A:
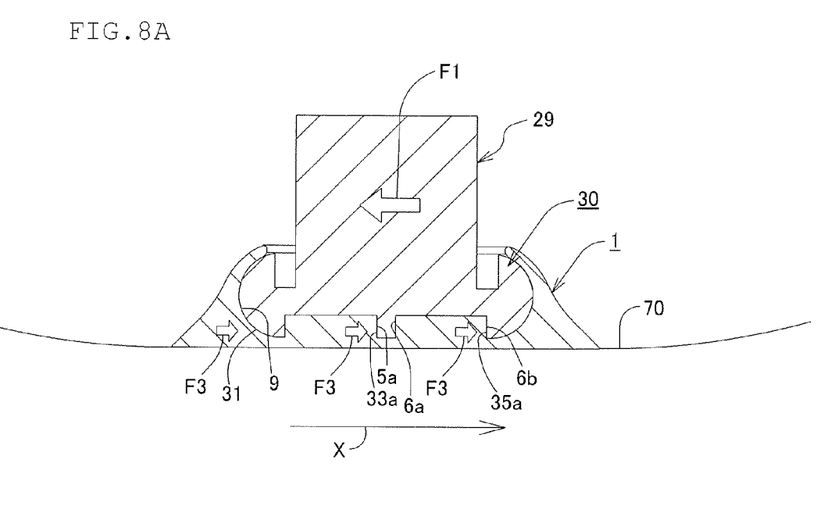
FIG. 8A and FIG. 8B are diagrams for explaining the action of the functional component mounting base of the Embodiment.

According to the embodiment of the invention, the functional component 29 is mounted on the inner surface 70 of the tire 60 via the functional component mounting base 1 and the functional component-side attaching portion 30. In this structure, the raised and recessed surfaces on the bottom of the fitting recess 2 in the functional component mounting base 1 are fitted with the recessed and raised portions on the bottom of the functional component-side attaching portion 30. Thus, at the leading end, where a peripheral part of the rolling tire 60 shifts from a non-contacting periphery into a ground-contacting periphery, and at the trailing end, where a peripheral part of the tire shifts from a ground-contacting periphery into a non-contacting periphery, the inertia force F1 that acts on the functional component 29 as the tire 60 rolls in the X direction as shown in FIG. 8A can be supported in a dispersed manner at three points (a plurality of load points F3, F3, F3), namely, the wall surface 6b of the semicircular projection 6 of the functional component mounting base 1 in contact with the wall surface 35a of the semicircular recess 35 of the functional component-side attaching portion 30, the wall surface 5a of the semicircular projection 5 of the functional component mounting base 1 in contact with the wall surface 33a of the partition projection 33 of the functional component-side attaching portion 30, and the inner peripheral surface 9 of the functional component mounting base 1 in contact with the outer peripheral surface 31 of the functional component-side attaching portion 30. As a result, a reduced burden is placed on the functional component mounting base 1. In other words, the functional component mounting base 1 with higher durability is realized because the inertia force F1 that acts on the functional component 29 when the rolling tire 60 engages with and disengages from the road surface is supported in a dispersed manner by a plurality of fitting surfaces of the raised and recessed portions on the functional component mounting base 1 fitted with the recessed and raised portions on the functional component-side attaching portion 30.

Figure 8B:
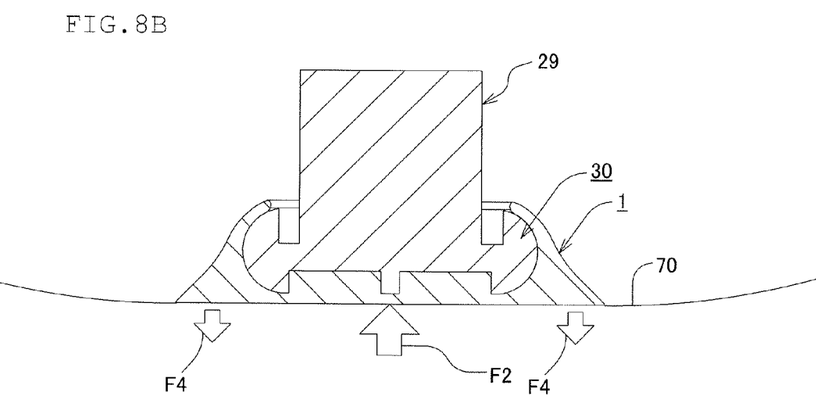

Also, the functional component-side attaching portion 30 and the functional component mounting base 1 made of rubber are not bonded to each other. Hence, as shown in FIG. 8B, the distortions resulting from an impact force F2 that acts on the functional component mounting base 1 when the tire 60 passes over a bump can be released by the elastic deformation of the functional component mounting base 1 and the slides F4 along the contact interface between the functional component-side attaching portion 30 and the functional component mounting base 1. Thus the functional component mounting base 1 having higher durability against impact forces that act thereon when the tire passes over bumps on the road is realized.

Also, as shown in FIG. 2, the functional component mounting base 1 in this embodiment is attached to the inner surface 70 of the tire 60 in such a manner that a plurality of raised portions (semicircular projection 5 and semicircular projection 6) are arranged side by side in the circumferential direction R of the tire 60 with a recessed portion in between. Thus, the inertia force F1 that acts in the circumferential direction of the tire 60 when the tire 60 rolls is supported in a dispersed manner by a plurality of positions. This reduces the burden on the functional component mounting base 1, thereby making it a highly durable functional component mounting base 1. It is to be noted that the number of the raised portions to be arranged side by side in the circumferential direction R of the tire 60 with a recessed portion in between may be several, namely, 5 or less, for instance.

Also, the functional component mounting base 1 in this embodiment has the inner peripheral surface 9 of the fitting recess 2 formed on the outer periphery of the semicircular-sectional shape forming the outer periphery of the circular-sectioned annular body with the central axis 2X of the fitting recess 2 as the center. And the inner peripheral surface 9 of the fitting recess 2 and the outer peripheral surface 31 of the functional component-side attaching portion 30 are fitted with each other. Thus the contact interface between the functional component-side attaching portion 30 and the functional component mounting base 1 is formed in an arced curve. This allows smoother slides along the contact interface, making it harder for distortions to concentrate on the functional component mounting base 1. As a result, the functional component mounting base 1 will feature an improved durability.

Also, in the functional component-side attaching portion 30 in this embodiment, the wall surface 5a of the semicircular projection 5 and the wall surface 6a of the semicircular projection 6 of the functional component mounting base 1, which come in contact with the wall surfaces 33a of the partition projection 33 of the functional component-side attaching portion 30, are formed as the planes extending in the radial direction of the tire 60. Accordingly, the strength with which the inertia force is supported in a dispersed manner becomes greater, and thus the inertia force can be supported with the planes of small areas. In consequence, the height of the projections can be made lower, the depth of the fitting recess 2 can be made shallower, and the functional component-side attaching portion 30 can be made smaller.

Also, the bottom of the fitting recess 2 of the functional component mounting base 1 is so designed that the area of the raised portions is greater than the area of the recessed portions. Hence, there are more parts with thicker rubber thickness between the outer bottom surface 4 and the top surfaces of the raised portions than parts with thinner rubber thickness between the outer bottom surface 4 and the bottom surfaces of the recessed portions of the functional component mounting base 1. As a result, the functional component mounting base 1 can have a structure of higher durability.

Figure 7:
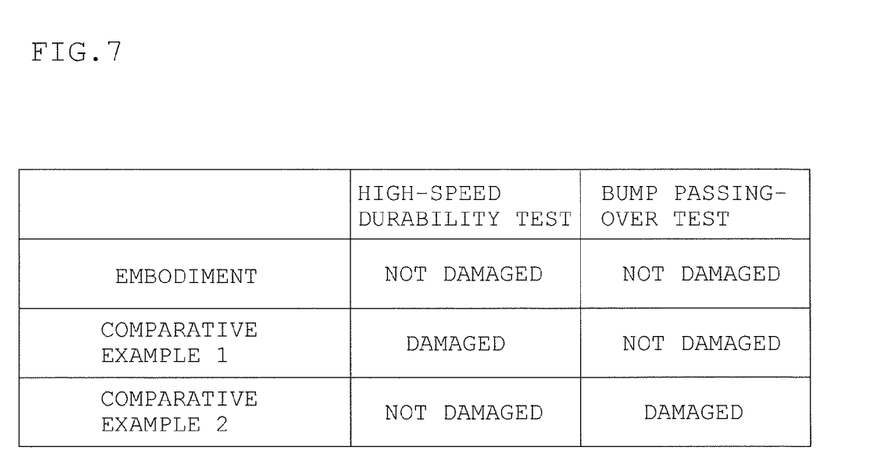
FIG. 7 is a table showing results of a durability test on functional component mounting bases of the Embodiment and of Comparative Examples.

A functional component mounting base according to the Embodiment of the present invention and ones of Comparative Examples to be discussed later were bonded to the inner surface of the tire, and the functional component was mounted on the inner surface of the tire by attaching the functional component-side attaching portion to the functional component mounting base. And the tires having the functional component mounted thereon were subjected to a test under the following conditions. FIG. 7 shows the results of the test in which damage or no damage to the functional component mounting base was checked.
(1) Tire: 225/50R17
(2) High-speed durability test: load: 620 kgf, air pressure: 260 kpa, running at maximum speed of 170 kph
(3) Bump passing-over test: load: 700 kgf, air pressure: 180 kpa, 360 times of passing over a 35-mm high bump at a speed of 50 kph As shown in FIG. 9, the functional component mounting base 100 and the functional component-side attaching portion 300 of Comparative Example 1 have no raised and recessed portions on the bottom of the functional component-side attaching portion 300, in contrast to the functional component mounting base 1 and the functional component-side attaching portion 30 according to the Embodiment.

As shown in FIG. 10, the functional component mounting base 101 and the functional component-side attaching portion 301 of Comparative Example 2 are of a structure as disclosed in Patent Document 1.

According to the functional component mounting base 1 and the functional component-side attaching portion 30 of the Embodiment, as described above, the inertia force F1 that acts on the functional component 29 when the tire engages with and disengages from the road surface can be supported in a dispersed manner at a plurality of points (plurality of load points F3, F3, F3). Thus, no damage to the functional component mounting base 1 occurred in the high-speed durability test.

Also, according to the functional component mounting base 1 and the functional component-side attaching portion 30 of the Embodiment, as described above, the distortions resulting from an impact force F2 that acts on the functional component mounting base 1 when the tire 60 passes over a bump can be released by the elastic deformation of the functional component mounting base 1 and the slides F4 along the contact interface between the functional component-side attaching portion 30 and the functional component mounting base 1. Thus no damage to the functional component mounting base 1 occurred in the bump passing-over test.

Figure 9A:
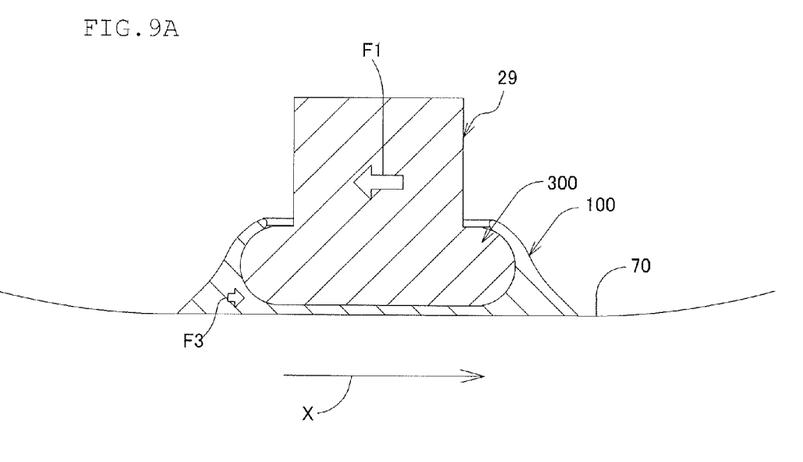
FIG. 9A and FIG. 9B are diagrams for explaining the action of a functional component mounting base of Comparative Example 1.

On the other hand, according to a mounting structure by the functional component mounting base 100 and the functional component-side attaching portion 300 of Comparative Example 1, as shown in FIG. 9A, the inertia force F1 that acts on the functional component 29 when the tire engages with and disengages from the road surface is supported at a single point of load point F3. As a result, a large burden fell on the functional component mounting base 100 and caused damage thereto in the high-speed durability test.

Figure 9B:
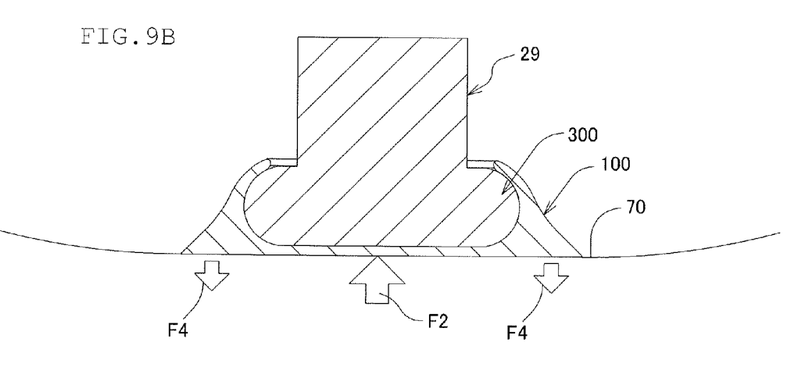

Also, according to the mounting structure by the functional component mounting base 100 and the functional component-side attaching portion 300 of Comparative Example 1, as shown in FIG. 9B, the distortions resulting from an impact force F2 that acts on the functional component mounting base 100 when the tire 60 passes over a bump can be released by the elastic deformation of the functional component mounting base 100 and the slides F4 along the contact interface between the functional component-side attaching portion 300 and the functional component mounting base 100. Thus no damage to the functional component mounting base 100 occurred in the bump passing-over test.

Figure 10A:
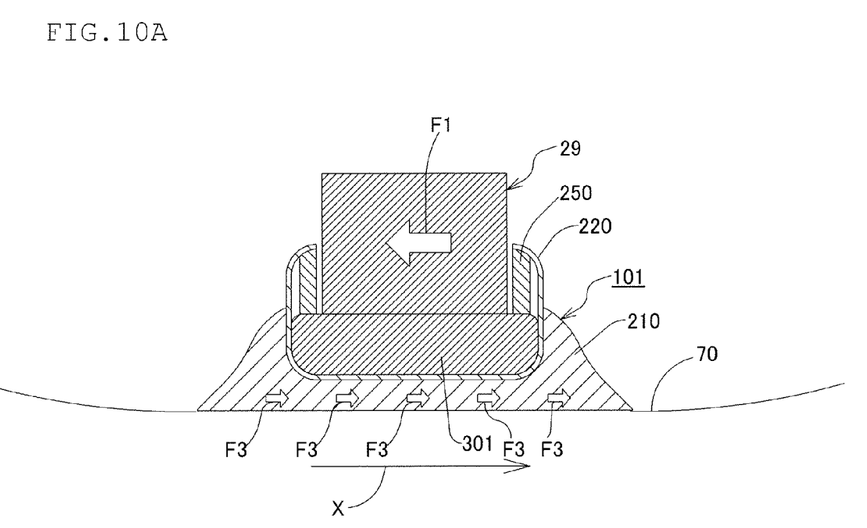
FIG. 10A and FIG. 10B are diagrams for explaining the action of a functional component mounting base of Comparative Example 2.

Further, according to a mounting structure of the functional component mounting base 101 and the functional component-side attaching portion 301 of Comparative Example 2, as shown in FIG. 10A, a functional component securing mechanism of high rigidity consisting of a frame body 220 and an insertion piece 250 is bonded to the base rubber 210. Hence, the inertia force F1 that acts on the functional component 29 when the tire engages with and disengages from the road surface can be supported by the entire functional component mounting base 101 (countless load points F3). Accordingly, the high-speed durability of the functional component mounting base 101 is enhanced, and no damage to the functional component mounting base 101 occurred in the high-speed durability test.

Figure 10B:
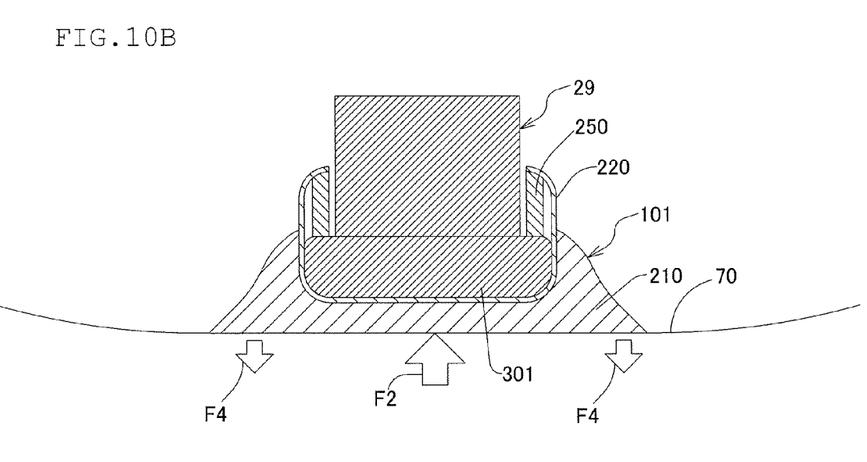

However, according to the mounting structure by the functional component mounting base 101 and the functional component-side attaching portion 301 of Comparative Example 2, as shown in FIG. 10B, the functional component securing mechanism of high rigidity is bonded to the base rubber 210. Thus, when an impact force F2 acts on the functional component mounting base 101 as the tire 60 passes over a bump, the deformation of the base rubber 210 is confined by the functional component securing mechanism of high rigidity, and there tends to occur a concentration of distortion along the interface between the base rubber 210 and the frame body 220 of the functional component securing mechanism where there is a difference in rigidity level. As a result, the durability of the functional component mounting base 101 is lowered, and damage to the functional component mounting base 101 occurred in the bump passing-over test.

As is clear from the results of the above-described performance tests, according to the functional component mounting base 1 of the embodiment, the inertia force F1 that acts on the functional component 29 when the tire engages with and disengages from the road surface can be supported in a dispersed manner, and an impact force F2 that acts on the functional component mounting base 1 when the tire 60 passes over a bump can be released by the slides F4 along the contact interface between the functional component-side attaching portion 30 and the functional component mounting base 1. Thus the functional component mounting base 1 was realized which has high durability against the inertia force F1 that acts on the functional component 29 when the tire 60 engages with and disengages from the road surface and the impact force F2 that acts on the functional component mounting base 1 when the tire 60 passes over a bump.

Also, the attachment of the functional component mounting base according to the embodiment to the inner surface of the tire provides a tire with high durability and capable of preventing the falling-off of the functional component.

It is to be noted that the functional component mounting base of the present invention may be attached anywhere on the inner surface of the tire as long as the inertia force that acts on the functional component when the tire rolls can be supported in a dispersed manner by a plurality of points.

DESCRIPTION OF REFERENCE NUMERALS 1 functional component mounting base
2 fitting recess 3 opening
3A opening diameter
5, 6 semicircular projection (raised portion)
8 partition recess (recessed portion)
9 inner peripheral surface (inner surface) of fitting recess
29 functional component
30 functional component-side attaching portion
30A maximum diameter of functional component-side attaching portion
31 outer peripheral surface (outer surface) of functional component-side attaching portion
34. 35 semicircular recess (recessed portion)
33 partition projection (raised portion)
60 tire
70 inner surface of tire

The invention claimed is:

1. A functional component mounting base made of a rubber material and attached to an inner surface of a tire to mount a functional component on the inner surface of the tire, the functional component mounting base having:
 a fitting recess into which a functional component-side attaching portion provided on the functional component is fitted;
 wherein the fitting recess is formed such that an opening diameter of an opening thereof to the fitting recess is of a dimension smaller than a maximum diameter of the functional component-side attaching portion, an inner surface thereof is formed as a fitting surface that fits with an outer surface of the functional component-side attaching portion, and a bottom thereof is formed as raised and recessed portions in a circumferential direction, which fit with recessed and raised portions formed on the functional component-side attaching portion.

2. The functional component mounting base according to claim 1, wherein the bottom of the fitting recess is provided with a plurality of raised portions.

3. A tire in which the functional component mounting base according to claim 1 is attached to an inner surface of the tire.

4. A tire in which the functional component mounting base according to claim 2 is attached to an inner surface of the tire.

* * * * *